Dec. 31, 1946.  A. T. CAHILL  2,413,288
PICTURE PROJECTION APPARATUS FOR STILLS AND FOR MOVING PICTURES
Filed May 5, 1945  6 Sheets-Sheet 1
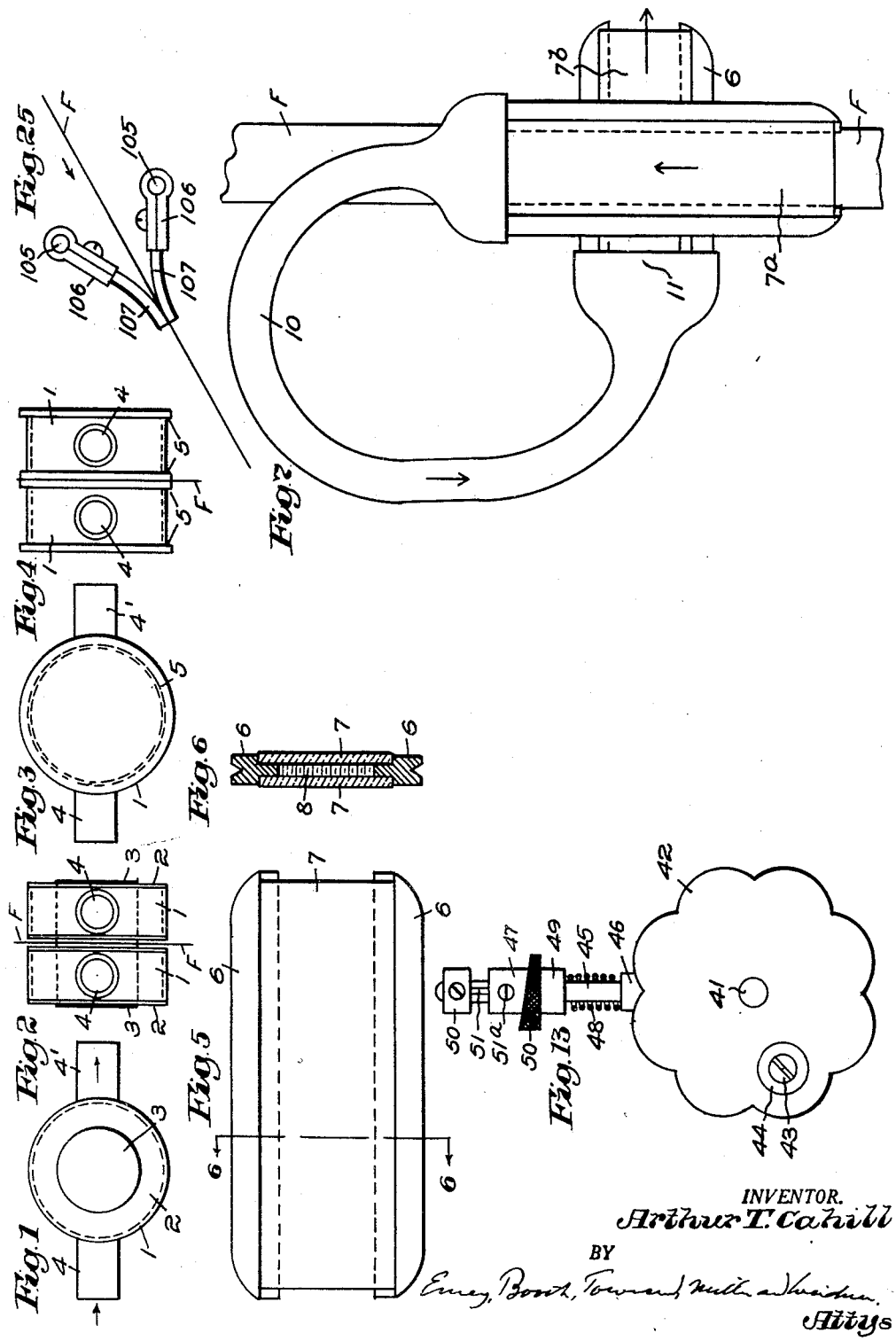
INVENTOR.
Arthur T. Cahill
BY
Emey, Booth, Townsend, Smith and Kneiden
Attys

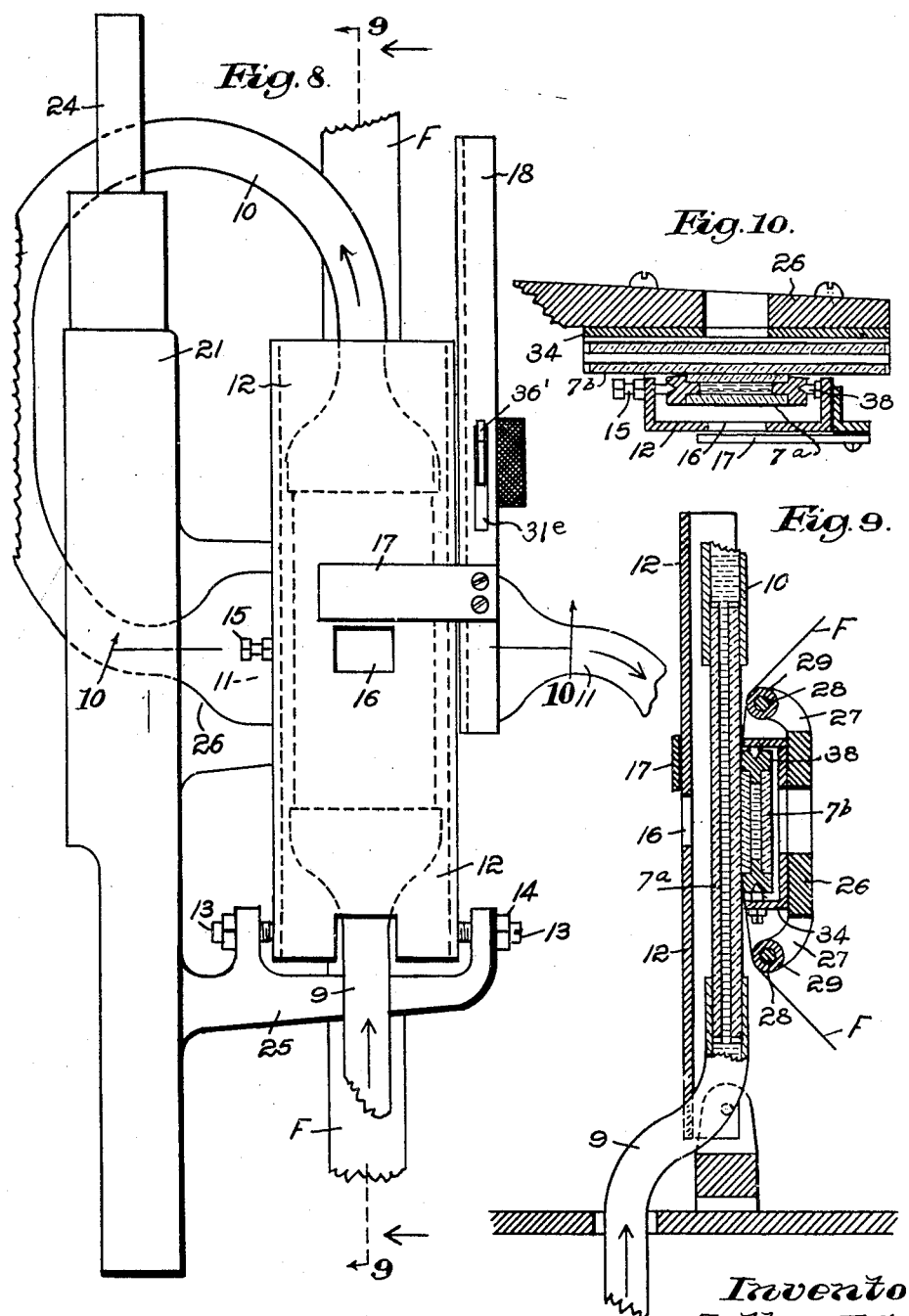

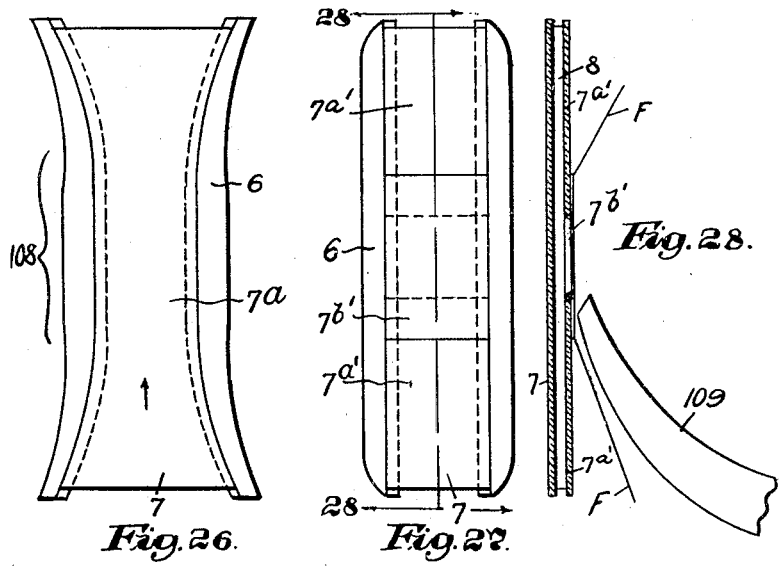
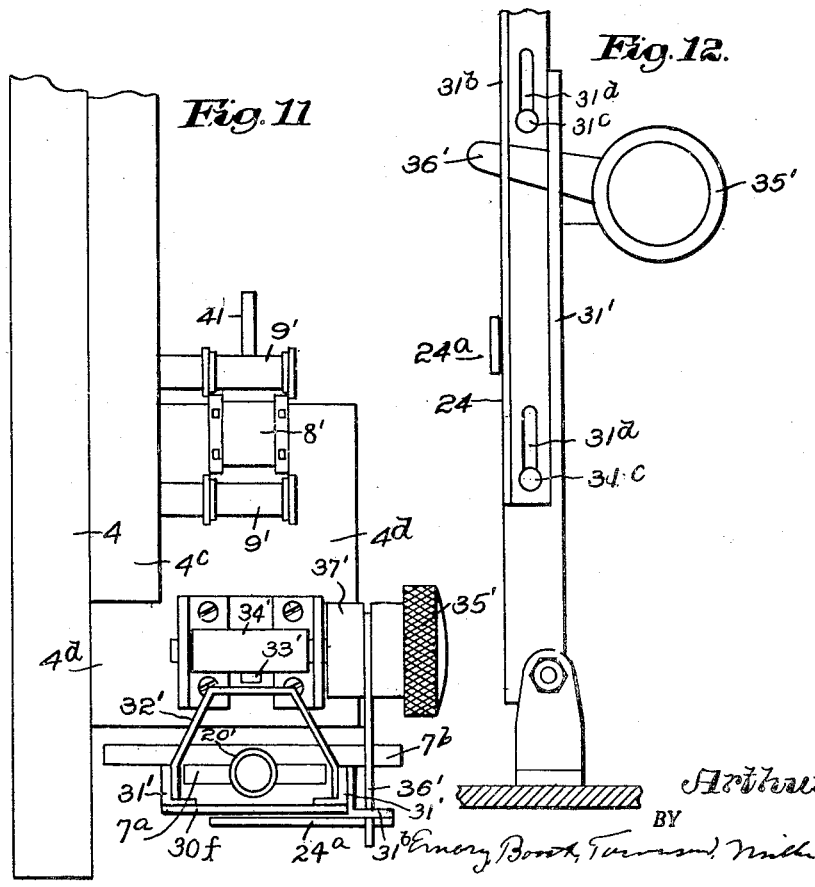

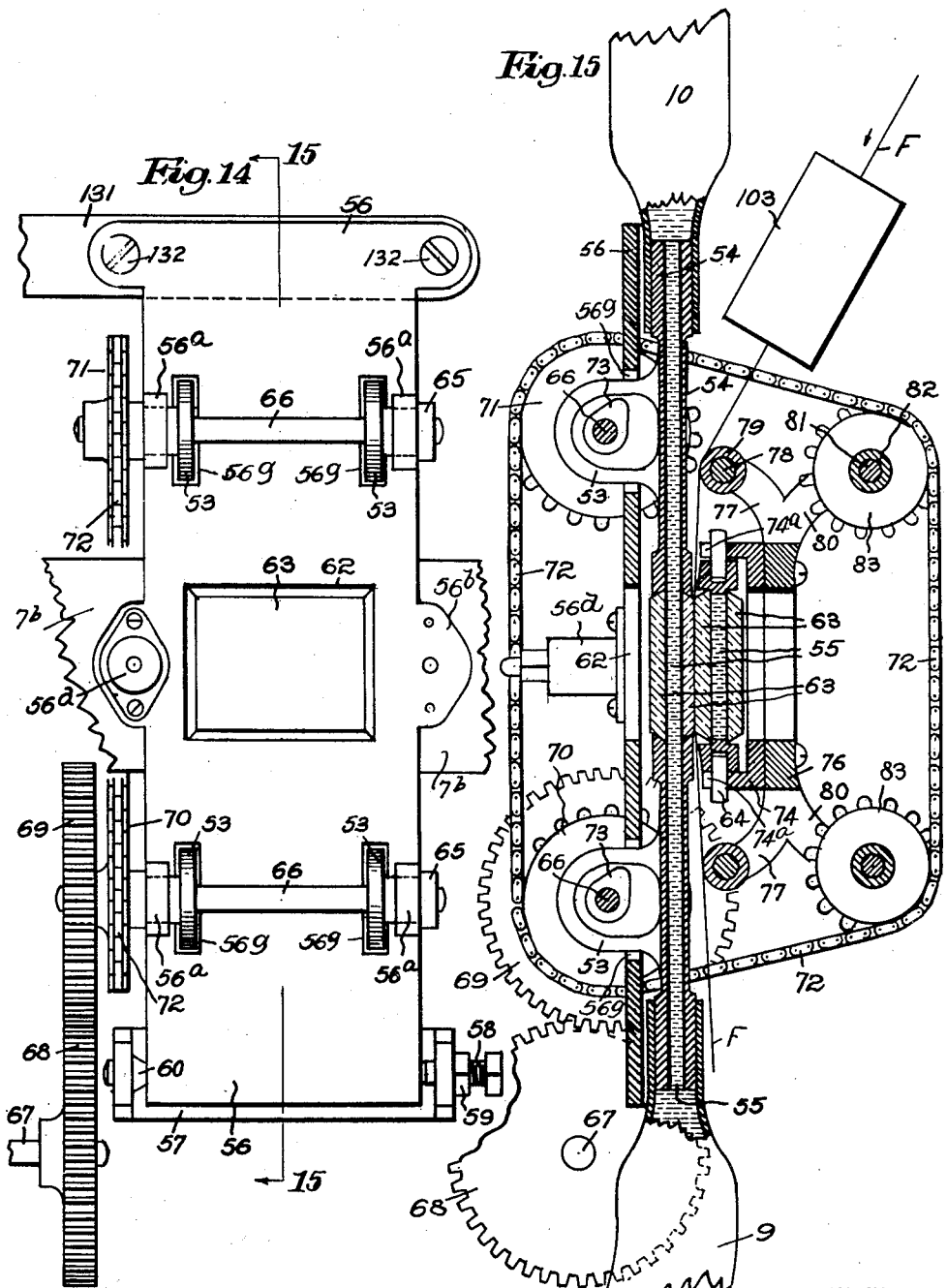

Dec. 31, 1946. A. T. CAHILL 2,413,288
PICTURE PROJECTION APPARATUS FOR STILLS AND FOR MOVING PICTURES
Filed May 5, 1945 6 Sheets-Sheet 5
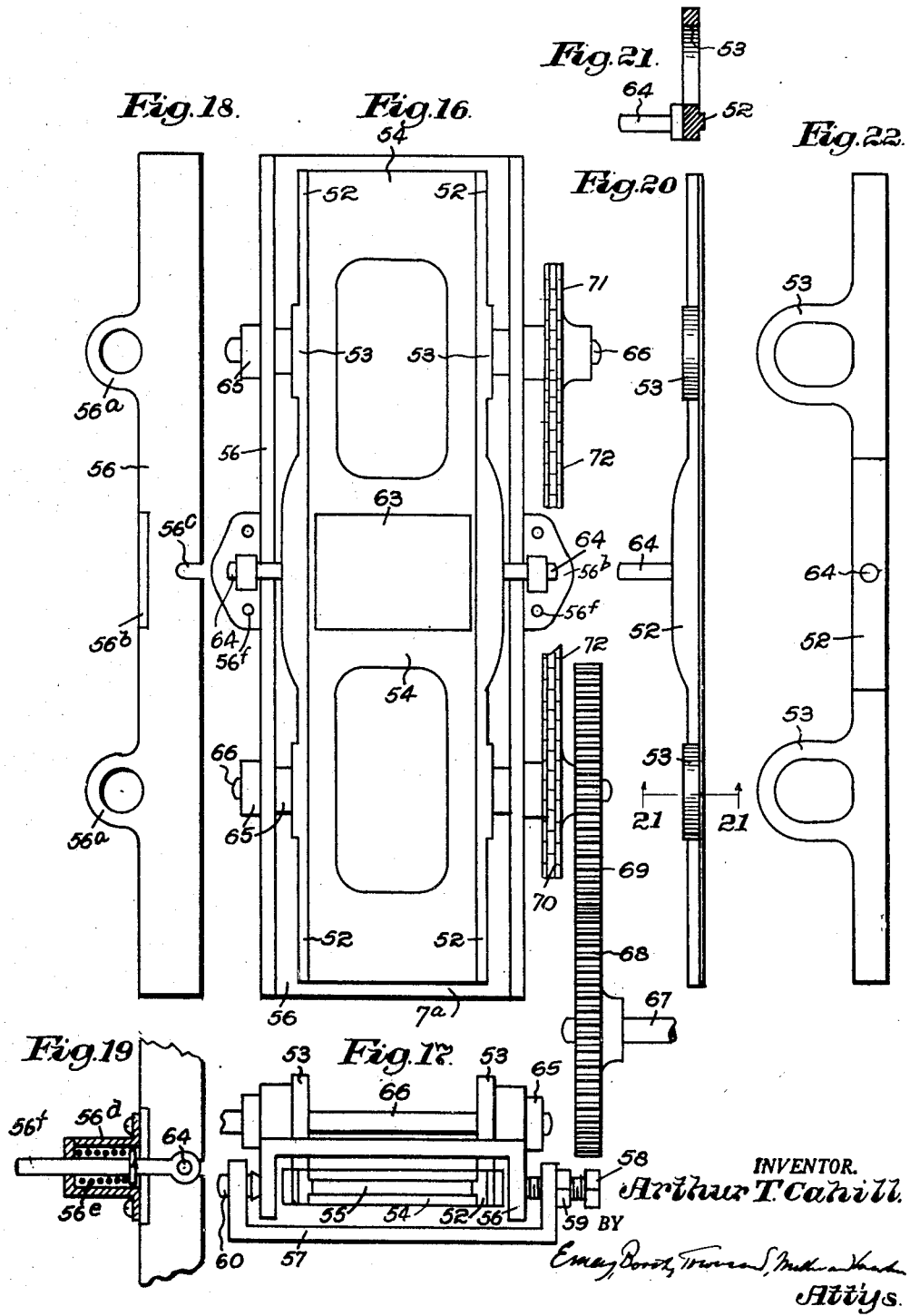

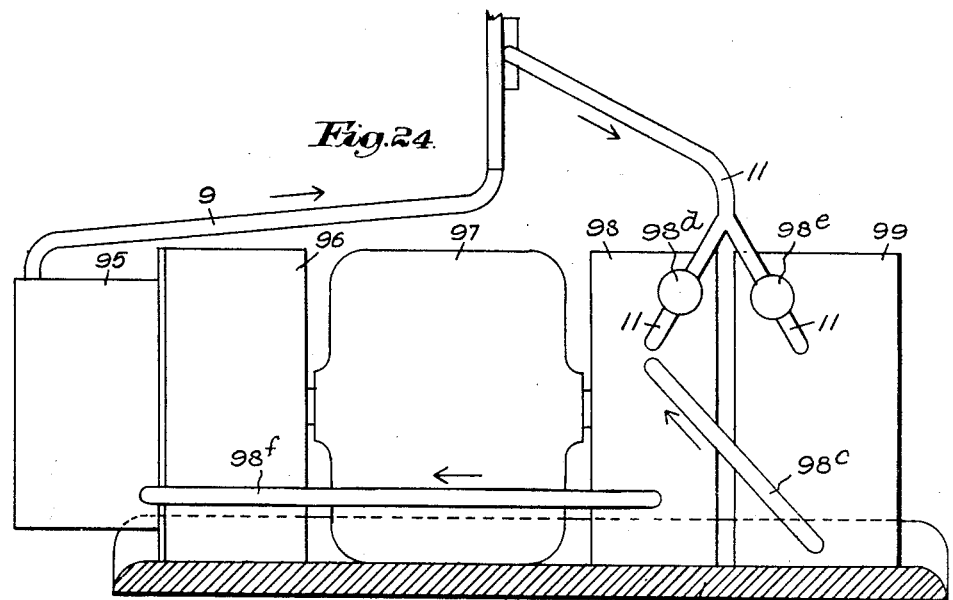
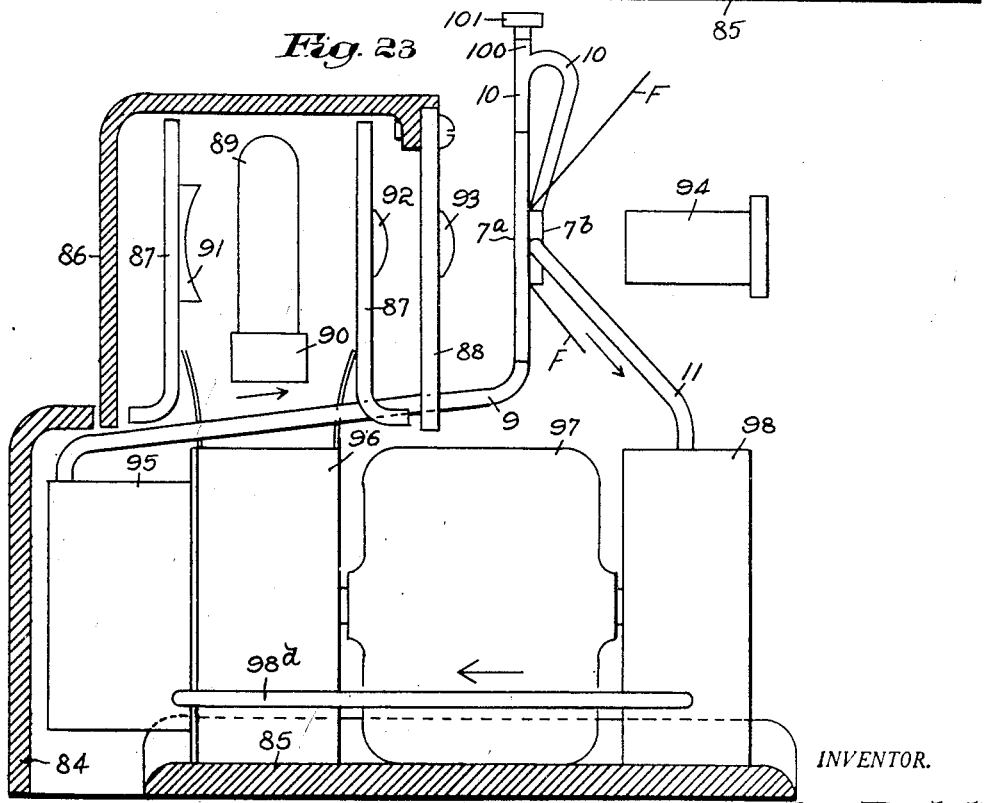

Patented Dec. 31, 1946

2,413,288

UNITED STATES PATENT OFFICE 2,413,288

PICTURE PROJECTION APPARATUS FOR STILLS AND FOR MOVING PICTURES

Arthur T. Cahill, Weehawken, N. J.

Application May 5, 1945, Serial No. 592,106

45 Claims. (Cl. 88—17)

This invention relates to apparatus for the projection onto a screen or equivalent, by the use of an intense beam of light, of pictures and particularly of pictures on films interposed between the screen and the light source. All or most of the features herein disclosed are adapted to the projection of stills and also of moving pictures when held stationary.

In the drawings, Figs. 1 to 13 relate mostly to still picture machines and the remaining figures to projecting machines for showing moving pictures, or moving and still pictures.

Fig. 1 is a front elevation of one form of cooling units for use on low light intensities only;

Fig. 2 is a side elevation of a pair of cooling units with the film clamped between them;

Fig. 3 is a front elevation of another type of cooling unit which will stand higher illuminations;

Fig. 4 is a side elevation of a pair of the units of Fig. 3 with the film clamped between them;

Fig. 5 is a front elevation of another type of cooling unit, capable of removing from the film many times the amount of heat from intense light ever used on 16 mm. films;

Fig. 6 is a horizontal section on the line 6—6 of Fig. 5;

Fig. 7 is a front elevation of two cooling units pressed against the film between them, and showing the tube connecting them and leading the cooling fluid from one to the other;

Fig. 8 is an upright elevation looking from the lamp toward the screen and showing part of the framing, etc.;

Fig. 9 is a vertical section through Fig. 8 on the line 9—9 thereof;

Fig. 10 is a horizontal section through Fig. 8 on the line 10—10 thereof;

Fig. 11 is a view looking from the top downward at the means for closing the gate before opening the cooling units for moving the film, and for closing the cooling units before opening the gate to show the picture;

Fig. 12 is a side elevation of the same mechanism;

Fig. 13 is an elevation of means for positioning the film in the gate easily and accurately;

Fig. 14 is an elevation of a projecting machine looking from the lamp toward the screen;

Fig. 15 is a vertical section on the line 15—15 of Fig. 14;

Fig. 16 is an elevation looking from the front or film side of the mechanism toward the lamp;

Fig. 17 is an end view, looking from below upwards, it having been turned over sidewise 180° and being in the same plane as Fig. 14;

Fig. 18 is a side elevation of the die casting that carries the oscillating cooling unit and showing the holes for the bearings;

Fig. 19 is a detail partly in section and partly in elevation of the center part of such casting, and showing the means of applying spring pressure to the oscillating cooling unit;

Fig. 20 is a top view of one of the side bars to which the top and bottom pieces of the cooling unit are attached;

Fig. 21 is a transverse section on the line 21—21 of Fig. 20;

Fig. 22 is a side elevation of one of the side members of the oscillating frame and showing the cam races and the pin receiving the spring pressure;

Fig. 23 is a somewhat diagrammatic view partly in elevation and partly in section, and showing the cooling radiator through which the air for the fan is drawn, the fan, the motor and the pump;

Fig. 24 is a view similar to Fig. 23, but showing a refrigerating machine added for installations where great amounts of heat have to be removed, the piping being so arranged that the refrigerating machine may be cut out or cut in as desired;

Fig. 25 is a detail in end elevation;

Fig. 26 is an elevation or front view of the streamlined cooling unit;

Fig. 27 is a front elevation of a variation of the type of cooling unit or cell shown in Fig. 7;

Fig. 28 is a vertical section through Fig. 27 on the line 28—28;

Fig. 29 is a side elevation of a modified form of cooling unit having manually operable means for wiping deposits off the inside thereof;

Fig. 30 is an elevation of another modified form of cooling unit having power actuated means for wiping deposits off the inside thereof;

Fig. 31 is an elevation showing diagrammatically means for forcing water through the cooling system under pressure, without using a pump in the apparatus;

Fig. 32 is an elevation similar to Fig. 14 but showing different means for separating the cooling units in synchronism with the feeding movements of the film in a moving picture apparatus; and Fig. 33 is a vertical section through a cooling unit somewhat similar to Fig. 28.

When photography was first invented about 1838, the pictures were so small that the desire arose to project them greatly magnified onto screens, so that they might be viewed by a large audience, but projection was impossible so long as pictures were taken on metal plates as they originally were. When pictures first came to be taken on glass plates, which would allow the passage of light and the projection of the picture onto a screen, earnest attempts were made to accomplish their projection, but if the light was intense enough to make the pictures worthwhile, the heat from the intense beam of light was so great that it destroyed the negatives and frequently cracked the glass plates.

Later when flexible films of cellulose or acetate were invented and various small sized negatives were used, the situation became much worse since these substances, being highly inflammable, became buckled or embossed in the presence of comparatively low heat and were ruined or set on fire by heat not much greater.

The constantly increasing demand over the last fifty years for much greater light has reached the point where the light from 1000 watt concentrated filament and even 1250 watt electric light bulbs is concentrated on a 16 mm. moving picture film, whose picture area is less than ⅛ of a square inch. It is a very difficult task to remove from a film all the heat generated by such extreme concentration of light and to prevent the film from becoming heated above a safe working temperature, which is not more than 170° F.

By my invention herein set forth, which is the result of several years of study and experimentation, I am able to use several times as much light on either still pictures or moving pictures as is used anywhere at the present time so far as I am aware.

The problem to be solved is a very difficult one since modern day practices demand that very intense light be used on very small areas of film, such as 8 mm. or 16 mm. films. Soon after the invention of moving picture film many attempts were made to devise some means for removing the heat from the beam of light, and a number of patents have been granted along this line, but since the desideratum is one for which there is a very great demand in the picture industry and since none of these devices is on the market so far as I can ascertain, it is a reasonable conclusion that none of these schemes was commercially workable and practicable.

Such earlier attempts may be divided roughly into three classes:

(1) Inventions of those who sought to take the heat out of the metal frame of the projector, since a not inconsiderable part of the heat from the arc lamp that did not pass through the gate of the apparatus hit the frame of the apparatus and rendered it so hot as to burn the hands of the operators which came in contact with the projector frame.

(2) Inventions of those who sought to take the heat out of a beam of light by passing it, before it reached the gate of the apparatus, through a hollow ring in which water is circulated. Such attempts are founded upon a wrong assumption and are inoperative. The false assumption is that a beam of light as it moves forward is hot. Actually a beam of light is not hotter than the air through which it is moving. The heat in a beam of light is not static heat but is kinetic heat (that is, the heat of motion). No heat is given off by a beam of light as it moves along at 186,000 miles per second, but intense heat is given off when the vast number of infinitely minute particles of which it is composed are suddenly arrested.

Moreover, light cannot be cooled. If it ceases to move forward, it ceases to be light.

(3) The class of invention to which my herein disclosed apparatus belongs, is so far as I am aware represented in the prior art only by the French patent to Emile Biquard, No. 472,387, published December 3, 1914. While Biquard had the germ of the correct idea of removing the heat from the film by clamping the latter between cool transparent surfaces, the apparatus disclosed by him is in my opinion entirely ineffective for many reasons, among which may be stated that a thermosiphon system cannot possibly impart a speed to the cooling liquid for even the use of a 1000 watt bulb on 16 mm. film, to say nothing of films upon which beams of light from powerful arc lamps are thrown. A positive pump giving the cooling liquid a speed of probably twenty-five to fifty times greater than that which could be imparted by a thermosiphon would be absolutely necessary to prevent ruining the film. Biquard, in Figs. 1 to 4 of his said patent, employs two solid quartz plates one at either face of the film. In Figs. 5 to 8 of his said patent, he discloses a movable hinged frame holding two quartz plates $mn$ separated a few millimeters, the space between said plates communicating at the bottom with a small box $h$ having conduits rising to the cooling vessel C which communicates by conduit $o$ with the space between said two plates $mn$. There is also provided in Fig. 9 on his said patent a winged radiator to be used when using very strong light "supplied by very large electric arc lamps." In no case, however, does Biquard show or specifically describe the use of both faces of the film of two quartz or other transparent plates slightly spaced apart for the circulation of cooling liquid. Biquard discloses no means whatsoever for preventing the formation of vapor bubbles in his circulatory system as would be necessary, nor any means for forcing cooling liquid across the surfaces of the film at such a speed and in such a way as would remove the intense heat and prevent turbulence or cavitation that would necessarily result in flickers. Other distinctions between the disclosure of Biquard and my present invention will be evident from the detailed disclosure herein of the latter.

My invention provides means to create a forced circulation of a stream of cooling liquid and which is herein disclosed as a closed circulatory system for cooling liquid for which there is employed a prime mover such as an electric motor on the ends of the armature shaft whereof are respectively fast a fan rotor and a circulatory pump rotor or impeller of small size. The circulatory system also includes a small cooling radiator. It also includes two small transparent cooling units through which water is circulated with great rapidity, such units being so small and light that they can be clamped to and removed from the film automatically fast enough for projecting motion pictures as well as stills.

The water must be shot rapidly across all the surface of both cooling units which the film touches. The speed of the water must be such that steam will not arise and form small bubbles of water vapor on the inside surfaces of the glass plates next to the film. The speed of the water must be so great as to prevent the formation of small bubbles of water vapor that will tend to merge into larger ones that would tremble in the water stream and cause the light on the screen to flicker.

It is essential that the speed of the circulatory water stream or jet be fast enough to keep the glasses of the cooling units so cool that bubbles of water vapor cannot form or must be of sufficient force to wipe off any possible small bubbles of water vapor from the glass plates before they are large enough to be visible. As more fully set forth hereinafter, the two units must be of such shape and so constructed as to accommodate a fast stream or jet of water without turbulence or cavitation, either of which would spoil the picture by the production of flickers. The circulatory system consisting of the pump, the cooling radiator, the tubing, the cooling units, and at times the refrigerating machine, must be so constructed that there will be no corners or pockets anywhere to trap air, and it is necessary that means be provided for pouring in the cooling liquid at the top of the system so that the latter will fill up from the bottom to the top without leaving air bubbles anywhere therein. If any bubbles are left in the circulatory system, they will be constantly chasing through the cooling units and causing flickers on the image projected on the screen.

It is, of course, necessary that the entire circulatory system, and in particular the stuffing or packing box of the pump, be so constructed that no air can be sucked into the system, since this would be ruinous to the pictures displayed.

By my invention I provide a simple, small and inexpensive means for removing from the film of a picture projecting machine the heat which is caused by the arresting of a part of the light which strikes the film and does not pass on to the screen. I am able by it to hold the film in the gate indefinitely, without the slightest danger to the film and without the faintest trace of embossing. This is equally true of black and white, or of films in color which are commonly supposed to be very tender. I am able to hold these latter stationary under 1500 watt illumination on 16 mm. film for an hour at a time without any injury thereto.

By the use of my herein disclosed apparatus I am able to project moving pictures of a brilliance, high class and quality never seen before. In the best modern picture machines the film begins to warp the instant the tremendously powerful light strikes it, and continues to move backward towards the lamp until the shutter cuts the light off. The picture is therefore never in sharp focus and so is fuzzy and lacking in sharp detail. My investigations reveal that the frame of film in the gate, held firmly at the edges, constitutes an elastic, thin diaphragm which is set in vibration by the rapid expansion, buckling and moving backward of the film in the gate, by the withdrawal of the prongs of the feeding claw or like feeding means, and by the vibration of the rapidly and jerkily moving parts of the machine. I believe that these are the causes of the eye strain which afflict so many moving picture lovers today.

In the practice of my invention, these causes will be entirely removed, as my apparatus presents every film frame in just the same spot to a thousandth of an inch and keeps it there while the picture is being projected, and the resulting pictures will therefore be just as sharp as the remarkably sharp lenses used in the best moving picture machines can produce. There is a great difference between the results a sharp lens will produce when focused on an absolutely still object, and one which is moving even though very slightly, for in the latter case it can never be focused sharply, but must strike a general average.

In a thoroughly practical projecting machine, whether for showing brilliantly lighted stills or moving pictures, it is necessary to use transparent cooling units which absorb but little light and between which the film is clamped firmly, while the light is on, and which are opened automatically just before either the feeding claw or other intermittently acting member pulls the film down, and which cooling units close again automatically and clamp the film firmly just as soon as the film is in place in the gate. The units must be very small and light in weight or it will be impossible to move them in the few thousandths of a second that are available for their motion. Such units must be very light in order to avoid making an offensive noise when they are opened twenty-four times a second and closed twenty-four times a second. There must also be provided a positive, rapid circulation of cooling liquid or compressed air or gas through the cooling units, and to that end a power actuated pump or compressor is necessary in connection with the cooling units as well as a cooling radiator and desirably a refrigerating mechanism.

Automatic means are necessary (which I have herein provided) for clamping the film firmly between the cooling units when the picture is being projected and for opening the units and releasing the film when it is time for it to move. A motor is required to drive the pump so as to shoot the cooling fluid through the system at a sufficiently high rate of speed to prevent deterioration of the film, which motor preferably carries a fan rotor on one end of its armature shaft and a pump rotor on the other end. With the cooling units are needed a fan or blower for cooling the lamp, the cooling radiator, and at times the film. Properly designed and streamlined cooling units are required through which the fluid can be pumped very fast without either turbulence or cavitation, either of which would damage the pictures on the screen. There is needed a properly designed circulatory system which has no corners or pockets in which air can be trapped, and into which the fluid can be poured at the top. The fluid will flow to the bottom and then rise gradually to the top again, driving the air before it, thus filling the entire system without leaving any air bubbles behind to create trouble by causing flickers on the screen. Means are required in a thoroughly practical projecting machine for removing dust or lint from the film, such as wipers or light brushes of felt or hair pressed against the film. Also means may be provided for removing dust or lint from the film and the lenses electrostatically, as well as mechanical means for wiping deposits off the inside of the cooling units. It is also highly important to enclose the cooling radiator in the fan or blower intake, so that all air going to the fan is sucked rapidly through the radiator, and to prevent light from reaching the film while the cooling units are open. It is also necessary to provide automatic means to close the safety shutter when the cooling units open and keep the shutter closed as long as the units are open, and which open the shutter when the cooling units close.

It is also neccessary to and I do provide means for rapid reeling of the film, which close the shutter and open the cooling units before starting and which close the cooling units against the film and then open the safety shutter, before starting to project again. Said means not only close the cooling units before starting and open the shutter, but reverse their movements before stopping. When showing stills, I provide means, such as a lever, button or wheel, the movement of which will close the shutter and open the cooling units, and then move the film one step at a time, the return movement of such means then closing the units against the film and opening the shutter, such means accomplishing the same results when the film is to be worked backwards. When showing movies, means are necessary and are provided for opening and closing the cooling units in proper synchronism with the film feeding mechanism and the safety shutter, so that the cooling units will be open and the said shutter closed, when the feeding claw or other intermittently acting member pulls the film down, such means exactly reversing the position of its parts when the feeding claw or other intermittently acting member has ceased its downward movement. Means are needed and are provided by me when projecting movies for showing stills, for disconnecting the film feeding mechanism, as by withdrawing one member of a clutch from the other member, and for reconnecting the feeding mechanism by reinserting said first member into the other half of the clutch at exactly the right instant and place, such means being, for example, a one-jaw clutch whose movable member is normally spring pressed into the fixed member which is on the timing driving shaft.

It is highly desirable to use on the surfaces of the glasses of the cooling units next to the film a suitable thin, transparent substance which is softer than glass, to relieve the pressure on the high spots of the film, which high spots cause spectral colors to appear in spots on the screen. Such substance is preferably a very thin, elastic, transparent material such as Lucite or nylon. Due to its softness the pressure of the springs will press it into very intimate contact with the entire surface of the film without undue pressure on the slight high spots, and therefore there will be no spectral colors in the picture on the screen. Due to its toughness and the very small area of the gate, it does not need to be more than .003" to possibly .010" thick, and though a much poorer conductor of heat than glass, it will conduct the heat away fast enough on account of its very great thinness.

Means are required and are provided herein not only for taking the heat out of the film and so preventing the backward motion or negative drift and the warping, buckling or embossing which is present in modern machines, but also for holding the film straight and flat, and always presenting successive frames in exactly the same place or plane to a thousandth part of an inch and holding the film there without change while the picture is being projected. Thus I am able not only absolutely to prevent the slow warping or moving backward of the film which is going on all the time it is being exposed in other projecting machines, but also completely to remove the rapid vibration of the frame and the film, which is in the gate and which is now present in commercial machines. I am thus able to produce very much sharper pictures and pictures of a very much greater depth of focus than can now be projected.

Present machines with temperatures of 1000° or more on the film are not in sharp focus at any time while the picture is being projected, because the film is in constant and rapid motion and so can never be in sharp focus. In many of the largest theatres the film moves backward from .015 to .018 during the time it is exposed to the light. With my mechanism the film is absolutely stationary, and the picture is in the sharpest focus the lens is capable of during the entire time of the exposure. It is therefore evident that my mechanism herein disclosed will show pictures with a clearness, sharpness and beauty never seen before. It is also evident that eye strain will be very greatly reduced.

Referring more particularly to the drawings, I will first describe my invention as related particularly to still picture machines and apparatus, as shown in Figs. 1 to 13, and in doing so I will first refer to earlier forms of my apparatus which are intended only for small illuminations.

In Figs. 1 and 2 is shown one of such earlier forms of cooling units and in Figs. 3 and 4 is shown another of said earlier forms of cooling units. Referring first to Figs. 1 and 2, I have indicated two short sections 1, 1 of metal tubing of suitable diameter placed end to end as indicated in Fig. 2. Therein are fitted at opposite ends thereof two metal pieces or disks 2, one of which is shown in plan in Fig. 1. Into said end disks 2, 2 are secured two glass cylinders 3, 3 which at their inner ends protrude a few thousandths of an inch so as to come into contact with the film F therebetween. There are thus provided two hollow cylinders and each of said cylinders has an inlet tube 4 and an outlet tube 4', said tubes 4, 4' being connected to a closed circulatory system, not shown in said figures. In the construction shown in Figs. 1 and 2, the cooling liquid, which preferably is water, itself suitably cooled, enters through each of the inlet tubes 4, 4, and, striking the glass cylinders 3, 3, separates into two streams which pass about the said cylinders and then issue through the outlet tubes 4', 4', and in doing so remove the heat that has been absorbed by the inner ends of the glass cylinders 3, 3, contacting with the opposite faces of the film.

In the early form of my invention shown in Figs. 3 and 4, I dispensed with the metal end pieces or disks 2, 2 and the glass cylinders 3, 3 of Figs. 1 and 2, and I have substituted therefor two circular glass disks 5, 5 about one millimeter in thickness. In this form of the invention I also provide the two inlet tubes 4 and outlet tubes 4' which are connected to a circulatory system, as with the form of the invention shown in Figs. 1 and 2. It will be observed that in the construction shown in Figs. 3 and 4 the heat has to travel but a very minute distance to reach the circulating water, and therefore this form of the invention will remove much more heat from the film than will that form shown in Figs. 1 and 2.

In Figs. 5 to 10 I have shown the preferred form of my invention. Referring first to Figs. 5 and 6, it is to be noted that they are drawn to a scale one and a half times the actual size, and they represent one of the horizontal cooling units. They and the pipes connected to them are so shaped that the cooling liquid can be pumped through them at a rapid rate without turbulence or cavitation. Desirably and as shown by practical use, the fluid passage through the unit is best when at least six times as long as the length up and down of the single frame of film. In said Figs. 5 and 6 there are represented at 6, 6, T-shaped straight pieces of metal to which are cemented the transparent plates 7, 7 which are preferably of glass with the best optical properties, the parts 6 and 7 forming a rigid unit. Between the two glasses 7, 7 of each unit is provided the passage 8 for the circulating water or other liquid. There are two such cooling units of the character shown in Figs. 5 and 6, but differing in length since the vertical unit has to be longer than the horizontal unit in the form of the invention in which they are employed in Figs. 7 to 10. Said Figs. 7 to 10 are drawn to actual size of one embodiment of my invention.

Preferably and as most clearly indicated in Figs. 7 and 8, I position one of the units horizontally and the other vertically at the two faces of the film and circulate the water through the two units successively and continuously at a very high rate of speed by means subsequently described herein. By placing them at right angles to each other and the film I reduce to the least possible the amount of film between them, and so reduce the troubles from the inequalities in the thickness of the film to a minimum.

In said figures, the liquid, preferably water, enters by the pipe 9, best indicated in Figs. 8 and 9, and constituting a part of the circulatory system. In Fig. 7, I have represented the cooling units of actual size, and I have therein and in Figs. 8 and 9 indicated the film F clamped between them. As shown in said figures, the vertical cooling unit, which is indicated at 7a is one inch longer than the horizontal unit indicated at 7b. This is necessary in order to provide room for the film rolls hereinafter referred to and over which the film passes, in order to keep the film from scraping on the edges of the horizontal unit as it passes into and out thereof, and also to keep the film from scraping on the edges not only of the tube 9, but the edges of the tube 10, shown in Figs. 7, 8 and 9 as leading from the upper end of the vertical unit 7a and thence bent in a broad curve wholly devoid of corners or pockets, so as to convey the water to the entrance end of the horizontal unit 7b, as best shown in Fig. 7. Thus in Figs. 8 and 9, I have indicated tubing through which the water is forced into the vertical unit at 9, and, passing upwardly therethrough, is conducted away from the vertical unit and into the horizontal cooling unit, as indicated at 10, and in Fig. 8 I have indicated at 11 the tubing that conducts the water away from the horizontal cooling unit to the power pump, hereinafter referred to, the film F being firmly clamped between the two cooling units by springs (not shown), which may be of any suitable construction for the purpose. In said Fig. 8, the said tubing cooling units and a portion of the main frame and the appurtenant parts are shown in the direction looking from the lamp toward the screen of the apparatus.

The casting which carries both of the cooling units is shown best in Figs. 8, 9 and 10. Therein there is shown a channel shaped piece of metal 12 having trunnions 13, 13 and nuts 14, 14 holding the trunnions in place, and at 15 is shown a trunnion holding the vertical cooling unit in position. The said metal piece 12 is provided with the usual gate 16 and a safety shutter for cutting off the light is indicated at 17, and at 18 is indicated the angle sliding on suitable studs which moves the safety shutter 17 up and down. In order to support the described parts of the mechanism, there is provided a suitable frame, indicated in part at 21 in Fig. 8, having an upwardly extending handle 24. Said frame in Fig. 8 is provided with suitable lateral or other extensions, in one of which, indicated at 25, are mounted the two trunnions 13. There are also provided suitable arms laterally extending from the main portion of the frame 21 and carrying the spools for the rolls of film. There are also provided, as best shown in Fig. 9 at 28, 28, bearing shafts on which the film rollers 29, 29 rotate, and which, as stated, keep the film from scraping on the edges of the horizontal glass elements 7, 7 of the horizontal cooling unit and on the edges of the tubes leading to and from the vertical cooling unit. The horizontal cooling unit is provided with a U-shaped metal piece 34, shown in section in Figs. 9 and 10, and by which it is mounted on its trunnions, one of which is indicated at 35 in Fig. 10, and the other of which is indicated at 38 in said figures.

Referring now to Fig. 13, there is represented at 41 a shaft connecting with the film feeding mechanism and thereon is fast a wheel-like member 42 having a fluted or cam edge for positioning the film in the gate. There is provided a handle 43 for turning the wheel 42 and having thereon a ring-like disk or sleeve 44 loosely supported upon the handle 43. Suitably supported above the wheel-like member 42 is an upright rod 45 terminating in a lower shouldered end 46 having its lower end machined to the same curves as the cam elements or flutes on the wheel-like member 42. There are provided arms 49 and 50 carried by the framing in which the rod 45 is axially slidable, and there is provided a spring 48 normally pressing the rod 45 downward so that its lower end 46 is in constant contact with the edge of the wheel-like member 42 when projecting stills. Upon the rod 45 is fast a collar 47 and between the support 49 and the said collar 47 is a knurled cam 50 which, when turned, raises the rod 45 out of contact with the wheel 42 when it is desired to project moving pictures. There is provided a suitable keyway 51 in the rod to receive the inner end of a screw 51 which prevents the rod 45 from turning.

In the construction shown in Figs. 11 and 12, parts of the main frame are indicated at 4, 4c, 4d. At 8' is indicated a sprocket wheel for feeding the film, and at 9', 9' the film rollers which guide the film onto and off the sprocket wheel 8'. At 20' is indicated the pipe carrying the cooling liquid away from the vertical unit 7a. The safety shutter is indicated at 24a and the horizontal cooling unit is indicated in this figure at 7b.

I have indicated at 31b an angle member having three slots therein, two of which are in the side next the angle 31'. A shouldered stud or pin 31c having a head passes through each of the slots 31d and is fast in the angle 31'. This construction allows the angle which carries the gate to slide up and down freely. The other slot 31e is at right angles to the slots 31d, 31d. An arm 36' fast on a shaft 34' works in the slot 31e and so moves the angle 31b and the shutter 24a up and down.

I have indicated at 32' a yoke to press the vertical cooling unit back away from the film, and at 33' a chisel-pointed screw to press the vertical cooling unit back. The screw 33' is set in a shaft 34'. Also fast on shaft 34' is a unit consisting of an arm 36' fast to a cam 37' and a knurled wheel 35'. The act of turning the wheel contraclockwise revolves the arm 36' downward and also the screw 33'. This acts to let the angle which carries the safety shutter drop down and cover the gate.

The parts are so proportioned that when the arm 36' moves down, the shutter will fall the entire distance necessary to cut the light off the film. It is then arrested by the studs 31c, 31c. This action occurs before the chisel-pointed screw 33' comes in contact with the yoke 32' and so begins to open the cooling units. The slot in the angle 31b is long enough so that the arm can move down far enough to open or separate from the film the two cooling units to the necessary amount. When the arm 36' moves the other way the action is exactly reversed. The pointed screw 33' rolls away from the yoke and the cooling units close firmly against the film before the gate begins to open.

As stated, the yoke is indicated at 32'. It is attached to the frame 31' against which yoke the flat point of the screw 33' rolls when it is desired to open the cooling units slightly so that the film will slide or feed between them without injury.

As stated, the arm 36' is fast on the shaft 34' and works in the slot in the angle 31b to move it and the shutter 24a fast on the angle 31b up and down, thus turning the light onto the picture and cutting it off when it is desired to open the cooling units and move the film. As stated, when the shaft 34' is rotated in a downward direction, the pointed screw 33' fast on the shaft 34' comes in contact with the yoke 32' to shove it slightly backward and thus open the cooling units so that the film can be moved easily.

There is indicated at 37' a double acting cam of the type which, if turned either way just past the center, will snap all the rest of the way under the action of the spring 38'. A heavy spring is preferably provided acting through the yoke or loop of wire 30e to pull the frame 31' and the vertical cooling unit mounted thereon against the horizontal cooling unit, thus clamping the film F firmly between them. Desirably an adjusting screw is provided to be attached to such heavy spring for adjusting the tension of the spring. The yoke indicated at 32' is attached to each side of the frame 31' near the top thereof. When the knob 35' is turned toward the left, it rotates the shaft 34' carrying the chisel-pointed screw 33'. In the normal position, the shaft 34' is rotated toward the right until the screw clears the yoke 32', but when the knurled knob is turned to the left, the chisel-pointed screw 33' comes in contact with the yoke 32' and shoves it backward, thus opening the cooling units sufficiently to permit the film to slide or feed through freely. As stated, the shaft 34' has thereon the cam 37' and the arm 36', such arm extending through a slot in the angle 31b held to the outer side of the frame 31' by the shoulder rivets 31c passing through the elongated slots 31d, thus allowing the angle 31b to move up and down freely.

In Figs. 14 to 25 I have represented my invention as applied to moving picture mechanism or apparatus. While in said figures, the horizontal and vertical cooling uits differ materially from those representing the previous types of units, they accomplish exactly the same results and in the same way. Since they represent mechanism for showing 35 mm. film movies, I have represented them as constructed of metal except for the windows 63, 63 which are of glass or quartz which are beveled at a 60° angle in order to resist the pressure of the fluid.

I will first refer to the construction shown in Figs. 14 to 22.

The framing for the motion picture apparatus to which my herein disclosed construction is applied may be of any suitable character. In the mechanism herein shown, there are provided side bars or rails 52, 52 adapted for 35 mm. pictures and having extensions 53 for cam raceways. There are provided top and bottom plates 54, 54 and a channel 55 through which the cooling liquid is forced at high speed by a power pump hereinafter referred to. A U-shaped frame 56 is provided in which the vertical cooling unit is mounted. Said frame has projections 56a, 56a having openings for sleeve bearings, to be referred to, and there are provided laterally extending projections 56b, 56b upon the frame 56 to which spring retaining cans 56d, 56d are screwed. There are also provided slots in the U-shaped frame 56 indicated at 56c, 56c for oscillatory shafts, and also retaining cans 56d, 56d for expansion springs 56e, 56e pressing upon the push rods 56f, 56f that press upon shafts, to be referred to, and thereby hold the cooling units against both faces of the film F. The U-shaped frame 56 has four openings 56g for the raceways 53, 53, and is provided with a supporting bracket 57, best shown in Fig. 17, having a screw trunnion 58, a lock nut 59 therefor and a shouldered trunnion 60. In Figs. 14, 15 and 16 there is shown in the framing an opening 62 for the passage of light, and transparent sheets of glass, quartz or other suitable material constituting the windows in the cooling units are represented at 63, and there are provided cam shafts 66, 66 rotating in bearings 65, 65 fast in the frame 56.

As shown in Figs. 14, 15 and 16, bearing sleeves 65 are provided in the frame 56 to receive parallel cam shafts 66, and at 67 is shown one of the shafts of the timing gears which drive the shutter and film feeding mechanism, and also through the gears 68 and 69 drive the mechanism for opening and closing the cooling units. In Figs. 14, 15 and 16 is shown a gear wheel 68 fast on the shaft 67, and meshing therewith a gear wheel 69 on one of the shafts 66. There is also mounted on said shaft 66 a sprocket wheel 70. Driven by the sprocket wheel 70 is a sprocket wheel 71 on the other shaft 66, it being driven by means of a sprocket chain 72. As best shown in Fig. 15, there are provided cams 73, 73 rotating inside the raceways 53 and imparting oscillatory motion to the vertical cooling unit, the raceways 53, 53 receiving the cams 73, 73, as best shown in Fig. 15. The cans 56d and their spring 56e hold the vertical cooling unit firmly against the film F and against the horizontal cooling unit as long as the small low parts of the cams 73 are under the large high parts of the cam races 53, but when the large high parts of the cams 73, 73 roll under the small low parts of the cam races 53, 53, they shove the vertical cooling unit away from the horizontal cooling unit a few thousandths of an inch, being the least amount that is necessary to let the film slide through without injury.

The springs 56e, 56e rest upon collars upon the bearing shafts 56f, 56f so as to transmit pressure to the said shafts 64, 64 in the side pieces 52, 52. There are provided slots 56c, 56c in the side pieces of the framing 56 into which the shafts 64, 64 fit snugly and oscillate a few thousandths of an inch back and forth. The horizontal cooling unit is mounted on similar shafts 64, 64, in a casting 74 having slots 74a, 74a for this purpose, and it is spring pressed backward against the bottom of the slots in the said casting 74. Such horizontal cooling unit is therefore free to align itself horizontally with the vertical cooling unit, which latter is free to align itself vertically with the horizontal cooling unit. Thus the proximate faces of the two units always come together perfectly and exert an equal pressure over all parts of the entire area of the film. This is of the utmost importance since without such construction spots would be burned in the film and spectral colors would appear on the screen due to undue pressure on its high spots. The heat on the film while it is in the gate is very intense, and if there be any small area of the film which is not in contact with the cooling surfaces of the horizontal and vertical cooling units, such area will be scorched or burned immediately.

By attaching, as I do, my timing mechanism to the shaft 67 of the film feeding and shutter timing mechanism of the projector itself, the horizontal and vertical cooling units are thereby made to open up just before the feeding claw of the film or other intermittently acting member starts its pulling down movement, and the said cooling units close together against the film just as the claw has finished its pulling down movement, and they remain clamped to the film till opened for its next pull-down movement. As is evident from Fig. 15, the mounting of the horizontal cooling unit is such, with respect to the rollers for guiding the film F between the cooling units, that the film will not be scratched against the edges of the glasses of the said cooling units.

It is evident from Fig. 16, which is a view looked at from the front of the mechanism backward toward the lamp, that the bearing push rods 56f, 56f press outward the bearings 64, 64 in the slots 56c, 56c, and thus the vertical cooling unit 7a against the film F and the horizontal unit 7b. The collars formed on the said push rods 56f, 56f allow only a few thousandths of an inch motion, and it is impossible for the vertical cooling unit to be itself displaced in the movement of the parts.

Referring particularly to Fig. 20, there is indicated therein one of the two similar side bar castings of the vertical cooling unit with its bearing shaft cast therein and having its cam races 53, 53, before referred to, which are shown in detail in section in Fig. 21. In Fig. 22 there is shown in side elevation the other side bar, there being two duplicate side bars 52, 52 and two duplicate top and bottom plates 54, 54, which when put together form the framing for the vertical cooling unit. The said side bars 52, 52 have a lengthwise projection in the center of the inside face thereof, on which the said plates 54 set firmly, such projection spacing them a suitable distance apart, which in practice is about one eighth of an inch, thereby forming the channel 55 between the plates 54, 54 and the glasses or other transparent material 63, 63, and the side bars or rails 52, 52 through which the water is forced very rapidly.

In Fig. 15 the main framing is shown as having an arm 76 to which the casting 74 is secured. It is provided with upwardly and downwardly extending arms 77, 77 carrying shafts 78, 78 for film rollers 79, 79 to guide the film F into the opening between the cooling units 7a, 7b, so as to prevent scratching of the film by the glasses. The arm 76 is provided with upward and downward extensions 80, 80 carrying shafts 81, 81 for the hubs 82, 82 of the idlers 83, 83 for the link belt 72.

In Fig. 23 and 24, wherein are represented mechanisms constituting a part of the circulatory system, a part of the rear of the main frame is indicated at 84. There is indicated at 85 a crosswise ribbed part, the top whereof is machined to an arc of a circle for receiving the mechanisms now to be described, or part thereof. An upward and rearwardly extending part of the main frame casting is indicated at 86, the lamp housing or lighthouse at 87, the upper front plate at 88, the lamp at 89, the socket at 90, the mirror reflector at 91, the concentrating lenses at 92, 93 and the projection lens at 94. Since these parts may be of any usual or suitable construction, a further description or illustration thereof is not necessary. The cooling units and the circulatory system are indicated on a small scale and somewhat diagrammatically in Fig. 23.

The casing for the cooling radiator is indicated at 95. Such radiator is placed in the intake of the fan or blower 96 so that all the air has to be sucked in through the radiator. The electric or other motor is indicated at 97 and on one end of the shaft thereof is carried the rotor for said blower or fan 96 and at the other end of said shaft is mounted the impeller for the pump 98. By mounting the said three elements upon the shaft, the noise and vibration is reduced to a minimum.

As shown in Fig. 24, there is provided a refrigerating machine 99 for cooling the circulating liquid where great amounts of light are needed. With the use of a refrigerating machine any amount of light that can be put onto a film can be handled easily and with perfect safety with my herein disclosed apparatus. It will be noted that the pipe 11 of the circulatory system normally enters into the pump 98, but if the valve 98d is closed and the valve 98e is opened, it will discharge into the refrigerating machine from whence it will be sucked up by the pump 98 through a pipe 98c and forced out through a pipe 98f, then through the cooling radiator 95 and so through the system. If it be desired not to refrigerate the lamp, I place a valve in the pipe 98f with a connection taken off between the pump and the valve and connected to the pipe 9 of the circulating system.

In Fig. 23 I have represented an upright extension or reservoir 100 of the tubing 10 for the purpose of pouring in the filling liquid and for venting air. With this construction the air bubbles will keep on going straight up and into the reservoir at the top of the tubes. At the top thereof is provided an air space and a knurled screw-cap stopper 101. Such upright extension or standpipe also acts as a reservoir for excess liquid not in actual circulation.

Referring again to Fig. 15, there is indicated at 103 an electrostatic dust and lint remover through which the film is passed so as to remove dust and lint before entering the gate. While this feature is not of vital importance in moving pictures, inasmuch as the blemishes from such specks of dust and lint will come at different points in each succeeding frame or picture on the screen and so are not too noticeable, the use of such an electrostatic dust and lint remover is of great importance in still pictures, where every speck on the film or on the lenses stands out prominently as a blemish in the picture on the screen.

In Fig. 25 I have represented one embodiment of means for mechanically removing dust and lint from the entering film which is passing downward between the parts of the device. For the purpose I have represented two studs or stationary shafts 105 on which are mounted brush holders 106, 106 containing soft brushes 107, 107 that contact with the two faces of the entering film.

The two cooling units are clamped firmly against the film when the light is on, and they are separated automatically a few thousandths of an inch just before the film feeding claw starts to pull the film down, and they close again automatically and clamp the film as soon as the film is in place in the gate. The two cooling units are very small and light in weight, and so may be moved in the few thousandths of a second available for their motion. In practice, the said cooling units are opened and closed twenty-four times a second. They are open only while the film is being pulled down and have nothing to do with the flicker blades.

The water or other cooling fluid or liquid must be very rapidly circulated, since, if it were circulated only as fast as can be produced by a thermosiphon of useable size, the water would boil as it passes through the cooling units, and, unless distilled, there would be left deposits on the glasses of said units, soon rendering the mechanism useless. Even with a faster flow of the liquid, but not at sufficient speed for the purpose of my invention, I have ascertained that vapor will form and gather as very fine bubbles on the inner surfaces of the glasses of the cooling units. These small bubbles will gradually merge into large bubbles, and then into still larger, which will tremble in the stream of water causing flickers on the picture on the screen. This continues until the bubbles have become large enough to be washed off by the stream of water, whereupon their places will be taken by other bubbles which have been forming behind them. I have discovered that when the stream of water is circulated fast enough, it keeps the glasses so cool that no vapor can form and hence no bubbles can form. In such case it is possible for me to hold the film in the gate all day, if desired, without injury to the film.

The necessary speed of the circulating water in the disclosed system of which the horizontal and vertical units form a part, is from about 50 to 125 feet per minute for 16 mm. film, according to the size of the lamp. In such a construction, the two cooling units are, of course, in series. If they were placed in parallel, as may be done within the scope of my invention, the speed of the cooling water could be somewhat reduced. With 35 mm. film and present high power arc lamps, the speed necessary is almost certain to rise to 500 to 1000 feet per minute.

The figures first above given refer to a 16 mm. projector and the speed is necessarily much greater in the case of a 35 mm. projector, and it would, in my opinion, have to be increased as much as eight times for use in a good size theatre, seating about 2500, and as much as ten to fifteen times in the largest theatres. If, however, a transparent refrigerant is used and a small refrigerating machine is employed as a part of the equipment, the speed of the circulating fluid can be very substantially reduced. By placing the cooling units in parallel, as I may do in certain cases, the speed of the circulating liquid can be reduced by possibly one half.

By compressing air or gases to a considerable extent and circulating them rapidly through the cooling units instead of water, the heat from medium sized illuminations can be carried away satisfactorily, but I prefer to use water as the circulating medium.

For circulating the cooling water or other liquid I provide the power actuated pump previously described. I also provide, as before stated, a cooling radiator in connection with the cooling units, the water or other liquid passing as described through the radiator which has a great amount of cooling surface in a very small area or space. This is very desirable since in a projecting machine all the parts thereof should be kept as small and light as possible, particularly with respect to a 16 mm. machine, which is portable, this feature of portability not, however, being true of a 35 mm. machine. In the 16 mm. machine the parts are so small and light that all the water in the machine, in the circulatory pipe or piping, the cooling units, the cooling radiator and the pump weighs just two ounces.

I have described one type of automatic means for clamping the film, such type of means being necessary to impart the required movements in the very small spaces or periods of time in which they must be made and which must be synchronized with the movements of the film feeding claws and shutter. As already described, the four cams shown in Fig. 14 press the vertical cooling unit back the few thousandths of an inch necessary to allow the film to slide through once for every rotation of said cams, and as the high spots of the cams leave the high spots of the races, the described spiral expansion springs force the vertical cooling unit back against the film and against the horizontal cooling unit.

While my invention is not necessarily limited thereto, I preferably employ a small electric motor, but within the scope of my invention I may employ a water motor or even a small gasoline engine where electric current is not available or even city water passing through a filter to the projector or projectors. As already described, the motor is preferably provided with a shaft on one end whereof the fan rotor is carried and on the other end the pump rotor or other impeller. Thus the power system is kept as small, light and quiet as possible. With a well designed and built motor the hum thereof is reduced to a minimum and the hum of the fan is slight. So far as I am aware, I am the first to employ for the purpose herein set forth a motor, fan, pump and cooling radiator.

I may also employ a small refrigeration machine which is highly desirable in the case of very large theatres where in some cases 180 amperes of current are used in the arc lamp. Therefore with my device much more light can be used. In certain cases (as in Fig. 28) I may use only one cooling unit, preferably the vertical one and in such case the film is held against it by a blast of cold air directed against the film at an oblique angle either from below or from above or from both sides, and in such case I provide a timing valve which will cut off the blast of air at the time the film is to be pulled down by the feeding claws, so that the film will be free to be moved, and then the blast of air is turned on immediately thereafter, this operation being carried out for each feeding movement of the film.

The cooling units and the entire circulatory system are so constructed that the cross section of the inner area thereof will be the same at all points thereof except at the cooling units where the speed of the circulating water will be accelerated at the gate, due to the smaller area of the units, thus bringing the circulating liquid into more intimate contact with the glasses of the cooling units, and so preventing the water vapor from forming bubbles as hereinbefore described. As best evident from Fig. 7, which is drawn to actual scale, and wherein the vertical cooling unit is seven or eight times as long as the height of one frame of film, there will be no eddies, turbulence or cavitation and no formation of bubbles. If the circulatory system had corners or pockets anywhere therein, in which air could be trapped, the resulting air bubbles would circulate through the system endlessly and cause flickers on the picture on the screen.

Particularly when showing still pictures there is a tendency for particles of dust, lint, etc., to gather on the film and although these particles are very small, they become very prominent when magnified thousands of times on the pictures on the screen. Also light particls may gather on the lenses, being attracted electrostatically and may ruin the beauty of still pictures, but as hereinbefore stated, by passing the film between two soft brushes of felt, hair or the like, pressed by light spring pressure against the film, such particles are removed from the film, or they may be removed from the film or the lenses by electrostatic devices, such as shown in Fig. 15 and already described.

I also desirably provide a safety device for wiping accumulations of foreign material off the inside faces of the glasses of both the cooling units and for that purpose the units are enlarged materially at one side so as to allow an arm carrying a brush of felt or other soft material which is desirably rotated or moved in or out by hand.

Desirably the cooling radiator in the fan intake is enclosed so that all the air for the fan is sucked through the radiator. This permits the use of a very small radiator. I also provide a safety shutter and mechanism to operate the shutter so as to cut off the light before the cooling units can be moved or opened, and such cooling units must be again closed against the film before the shutter can be opened to admit the passage of light.

In Fig. 26 is illustrated a streamlined cooling unit indicated generally at 108. The purpose of the construction therein shown is very much to accelerate and decelerate the stream of cooling fluid or liquid. The construction will double the speed of the cooling liquid entering it as it passes under the gate. As therein shown, it has a straight run in the center, considerably greater than the size of a frame of film. Therefore the speed of the water is doubled and the pressure against the glasses or other transparent material is very materially increased and so the heat is removed faster.

I have in the specification describing the invention stated that the speed of the circulating liquid is uniform. It is uniform in all parts of the circulating system excepting in the cooling units where the best results are produced by accelerating the speed of the flow. In the streamlined form of the cooling unit illustrated in Fig. 26, the structural parts are substantially the same excepting for the shape, as in Figs. 5 and 7 to 10.

In Figs. 27 and 28 is shown the general type of cell or cooling unit illustrated in Figs. 5 and 7, and the same reference characters are used therein for corresponding parts. However, the glass or transparent sheet on the side next to the film is, in Figs. 27 and 28, made in two pieces 7a', 7a'. They are spaced apart at the gate a distance greater than the gate, as is indicated by the dotted lines in Fig. 27. A piece of flexible transparent material 7b' is cemented to the side of the glasses next to the film at each face thereof. Because of this construction, the glasses in this form of the invention do not touch the film, though they do press the membrane against the film above and below the gate, but with two such cooling units, one on each side of the film, the thin flexible substance will, from the pressure of the circulating fluid, settle or nestle into all of the low spots of the film which are only a very small fraction of a thousandth of an inch at the most. This, therefore, will be done without putting sufficient pressure on the high spots of the film to cause spectral colors. For the purpose I may employ any suitable material. Preferably I use Lucite, nylon or equivalent, but my invention is not restricted to that material.

In Fig. 28 is shown, in addition to what is shown in Fig. 27, a pipe 109 connected to a fan or blower in such a way as to blow cooling air against the membrane or sheet 7b' and the film. This construction may also be employed with the double glass cooling unit shown in the preceding forms of the invention.

In Fig. 29, I have represented a slightly modified form of cooling unit in that it is provided with means for removing by manually operated means any deposits from the inside of the cooling unit.

In said figure, the cooling unit is or may be of the same construction as shown in Fig. 8, and the same reference characters are employed so far as appropriate. In said figure is represented a vertical cooling unit 7a of substantially the same construction as is shown in Fig. 8, and connected up in the same manner to the circulating system as is the construction shown in Fig. 8. In order, however, to provide manually operated means for wiping deposits from the inside of the cooling unit, the upper end of said unit is curved as indicated at 110, and extending from the curve of the unit is a wiper 111 of felt or other suitable material which fits snugly between the glasses of the cooling unit, so that when moved up and down, it will clean them. I have represented at 112 a housing attached to or integrally formed with a member or part of the cooling unit and in communication with the interior thereof. The wiper 111 is received in said housing which is provided with a stuffing box indicated at 113, through which slides a piston 114 terminating in a knob or handle 115, by which up and down movement may be manually imparted to the felt or other wiper 111 when desired. In this form of my invention, the cooling water or other circulating fluid enters at the bottom and passes upward in the direction of the arrow and out through the side at the top, the construction being such that the hand operated wiper, which fits rather tightly in the housing, may be moved up and down so as to clean accumulations of sediment and dirt from the glasses.

In Fig. 30, I have represented a further form of means for accomplishing the same purpose, but wherein the wiper is power driven. In said figure, the cooling unit is represented in elevation and is shown as having a lateral semicircular enlargement 116 to receive therein a shaft 117, whereon is mounted a felt or other wiper 118. The shaft 117 is driven by a worm or other means from the motor of the apparatus at a very low rate of speed, so as to rotate the wiper 118 upon the shaft 117. The wiper, shown in dotted lines in the semicircular lateral extension 116, moves in a circular path into and out of the body portion of the cooling unit. Means may be provided to rotate the said wiper 118 periodically or at times, or it may, if desired, be driven constantly at a low rate of speed.

I have described the preferred form of my apparatus wherein a pump is employed as a part of the apparatus so as to make a compact organization.

I contemplate, however, forcing water through the cooling system under pressure without using a pump in the apparatus itself, and in Fig. 31 I have diagrammatically indicated a system for the purpose. The pump employed would in such case be at the city water works, and I would connect a pipe to the water system as indicated at 119 in Fig. 31. The pipe 119 conducts the water into a very large filter 120 having the full water pressure thereon. In this manner the water is well filtered, since its passage through the filter is very slow and thus no pump in the apparatus itself is necessary. I have represented at 121 the exhaust pipe feeding the water from the filter 120, and extending from said exhaust pipe are a series of branch pipes 122a, 122b, 122c, 122d and 122e, leading respectively to the several projecting machines, of which as many as five are provided in some of the largest moving picture houses for alternative use.

I have stated that when showing movies, means are provided by me for opening and closing the cooling units in proper synchronism with the movements of the film feeding mechanism and of the safety shutter, so that the cooling units may be opened and the safety shutter closed when the feeding claw pulls the film down, the cooling units being returned into substantially firm contact with the oposite faces of the film when the latter is stationary.

In Figs. 14, 15 and 16, I have represented one form or type of means for imparting such opening and closing movements to the cooling units. My invention is not restricted to the means shown in said figures, as other types of means may be employed for the purpose.

In Fig. 32 I have represented other means for accomplishing the same purpose. So far as the general parts of the apparatus are concerned, the construction shown in Fig. 32 is similar to that shown in Fig. 14. It differs therefrom in that the projections 56a on the castings 56, shown in the first described form, are omitted, as well as the bearing sleeves 65, 65 and the shafts 66 with their cams 73. Also, in the form shown in Fig. 32, I do away with the four holes through which the cam races 53 protrude. Instead I provide four round holes 129 through which protrude pull rods 130. The said pull rods extend to any suitable source of movement, but preferably to magnets of the rotating armature type, wherein the armature stands between the two poles at such an angle that its diagonally oppostie corners are slightly outside the corners of the poles and revolve on an axle inward when the current is on. Such type of magnet is very fast in the speed of its operation and is entirely noiseless since the armature merely revolves through a small arc of a circle.

Instead of employing cams or other mechanical means, as shown in Figs. 14 and 15, or instead of employing electromagnetic means, as shown in Fig. 32, I may provide electropneumatic means, using a considerable pressure of air to get the necessary speed.

So far as I am aware, I am the first to provide means for moving the cooling units into and out of contact with the faces of the film in synchronism with the movements of the film, and therefore claim the same broadly.

It will be observed that in the construction shown in Fig. 32, I provide an arm 131 laterally extending from the main framing of the apparatus, to which the U-shaped frame 56 is fixedly connected by screws 132, as shown. The same means, as shown in Fig. 32, for securing the U-shaped frame 56 to the main frame of the apparatus, may be employed with the construction shown in Fig. 14.

If desired, the solid, one-piece frame 56 may be provided or a built-up frame composed of several channel parts may be employed, as in Fig. 11. Preferably I provide a solid one-piece frame.

I have, in Fig. 33, represented one cooling unit which is similar to that shown in Fig. 28, excepting that both of the glasses are complete full-length glasses, and the inner glass next to the film has a thin sheet of some suitable transparent substance such as Lucite or other material operating, on account of its softness, in the manner already described to remove the spectral colors. While in Fig. 33, only one of the cooling units is shown, it is to be understood that both cooling units would be of the same construction and character. In said figure, the two glasses are represented at 133, 134, and to the face of the glass 134 next to the film is applied some suitable transparent material 135 such as Lucite or nylon.

Lucite is a poor conductor and melts at a low point. Nevertheless, it has certain advantages, including transparency. My invention includes the use of any suitable substitute for Lucite. So far as I am aware, no material has been used for my purpose upon a cooling unit, and I claim this feature of my invention broadly.

While in the specification and the claims I have used the term "sheets" with respect to the faces of transparent, glass-like material between which the stream of cooling liquid or fluid is circulated, such term is used in a broad sense to include pieces of transparent material regardless of the size or shape thereof. Such pieces may have the shape of strips in certain instances.

Concerning the speed of circulation of the liquid, it is to be noted that the speed must be sufficient to prevent the formation of bubbles, or fast enough to wipe them off the faces of the glass-like pieces of the cooling units before such bubbles become visible. When using a 1000 watt, concentrated filament bulb with a 16 mm. film, the circulating speed of the liquid should be at least fifty feet per minute. When using a 500 watt bulb, a speed of twenty-five feet per minute would probably be sufficient. I have obtained excellent results when using a speed of about one hundred and twenty-five feet per minute with a 1000 watt bulb. When using the streamlined cell herein disclosed, the speed of the liquid is very materially increased in the cell, and the pressure of the liquid is increased before reaching the gate and while under the gate. My invention, however, is not limited to any specific speed, but for the best results, it must be such as to prevent the formation of bubbles or to wipe them off before they become visible.

I have throughout the specification referred to an electric motor. Within the scope of my invention a water motor, a gas or gasoline motor, or any other suitable source of power may be employed provided the cooling liquid or fluid is circulated thereby at a sufficiently high rate of speed to prevent the objectionable formation of vapor bubbles.

Referring to the cooling units, it is to be noted that I provide, as shown in Fig. 28, two cooling units each having a piece of glass-like material on its outer face and two short pieces on its inner face spaced apart a distance greater than the gate, the opening between the ends of said two pieces being covered by a thin piece of Lucite-like material which is, by the action of the circulating cooling liquid or fluid, pressed into very intimate contact with both faces of the film, thereby preventing spectral colors in the picture on the screen. This is entirely new in the art so far as I am aware. These spectral colors may, I believe, be due either to undue pressure on the high spots of the film or lack of perfect contact between the glasses and the low spots of the film. It will be observed from the disclosure herein that I may and do cover the glass-like material of any one of the cooling units with suitable transparent soft, Lucite-like material to prevent spectral colors, and I also disclose a special cell or cooling unit in which there is no glass-like material at the inner surface of the cell at the gate, there being at that point only a thin membrane or piece of suitable thin, transparent, soft and tough Lucite-like material which the circulating fluid or liquid presses against the film to prevent spectral colors.

I have in the specification described one form or shape of cams for producing the in and out movements of the cooling units with respect to the faces of the film. Wedges constitute one form of cams which I may employ for the purpose. I may, instead of using mechanical means such as cams, employ magnets or employ electropneumatic means or employ pneumatic cylinders operated by gridiron valves. It will be understood that the time available for the in and the out motions of the cooling units is only a few thousandths of a second in each case. Such motions, and particularly with the use of cams of the proper type and pneumatic cylinders, start gradually and accelerate rapidly in the separating movement of the units. In the return motion of the units, the movements should start rapidly and decelerate slowly, so that there is no bang or injury to the glass-like material of the units.

Having thus described several embodiments of the invention, it is to be understood that although specific terms are employed, they are used in a generic and descriptive sense and not for purposes of limitation, the scope of the invention being set forth in the following claims.

I claim:

1. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent glass-like material slightly spaced apart, supported in pairs at both faces of the film in substantial contact therewith, said pairs of slightly spaced sheets providing at opposite faces of said film respectively, two, distinct, hollow, transparent, cooling units for the continuous passage therethrough of cooling liquid, flexible tubing connecting both the inlet and outlet ends of the cooling units with circulation creating means of the projection apparatus, and means to create a forced circulation of such cooling liquid in a circuit through said tubing and through both of said cooling units.

2. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, a member movably connected to said framing so that it may be moved into and out of functioning position at one face of the film, and having an opening to be brought into register with the said opening in the frame, the said member carrying the said pair of transparent sheets that in functioning position is at said last mentioned face of the film.

3. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, a member movably connected to said framing so that it may be moved into and out of functioning position at one face of the film, and having an opening to be brought into optical alignment with the said opening in the frame and the light source, the said member carrying the said pair of transparent sheets that in functioning position is at said last mentioned face of the film, said cooling liquid circulating means having a portion thereof movable with the movably mounted member when the latter is moved out of its functioning position, without necessarily interrupting the circulation of the cooling liquid through said means.

4. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, said means to circulate a stream of cooling liquid including a portion conveying in operation said stream transversely across the opening for the film at one face of the film and another portion conveying in operation said stream in a substantially vertical direction at the opposite face of the film.

5. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, the means to circulate a stream of cooling liquid including an electric motor and a pump operated thereby and through which the said stream is forced by the motor-driven pump.

6. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, the means to circulate a stream of cooling liquid including an electric motor, a shaft therefor, a pump for circulating said liquid stream, and a pump and fan rotor mounted upon said shaft and operated thereby.

7. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, the means to circulate a stream of cooling liquid including an electric motor, a pump operated thereby and through which the said stream is forced by the motor-driven pump, and a cooling radiator through which the stream of cooling liquid passes in its course past one face of the film, on its way to the other face of the film.

8. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, and means to prevent the formation of vapor or air bubbles in the cooling liquid circulating means and between the sheets of transparent material constituting said cooling units.

9. A picture projection apparatus in accordance with claim 1, but wherein the means to circulate a stream of cooling liquid through said units past both faces of the film includes tubing arranged throughout in straight and curved paths that are devoid of interior pockets and corners to trap air so as to interfere with the perfect circulation of the cooling liquid.

10. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, and means to force the cooling liquid in a rapid jet across all of the inner surfaces of both pairs of the said transparent sheets.

11. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, and means to force the cooling liquid across the inner surfaces of both pairs of the said transparent sheets at a speed sufficient to prevent the formation of steam and the consequent formation of bubbles on the inner surfaces of any of said transparent sheets.

12. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, the said sheets of transparent material and their mountings constituting a pair of cooling units shaped and mounted to accommodate therein the passage of fast jets of cooling liquid without turbulence or cavitation producing flickers.

13. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, the said closed circuit is provided at the top thereof with a filling standpipe by which air bubbles are exhausted from the closed circuit and the closed circuit is filled from the bottom thereof to the top through said standpipe.

14. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, the means to circulate a stream of cooling liquid past both faces of the film including a pump, tubing and also a cooling radiator, all of which are interiorly devoid of pockets and corners to interfere with the perfect circulation of the cooling liquid without vapor bubbles.

15. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent glass-like material slightly spaced apart, supported in pairs at both faces of the film in substantial contact therewith, said pairs of slightly spaced sheets providing at opposite faces of said film respectively, two, distinct, hollow, transparent, cooling units for the continuous passage therethrough of cooling liquid, flexible tubing connecting both the inlet and outlet ends of the cooling units with circulation creating means of the projection apparatus, and means to create a forced circulation of such cooling liquid in a circuit through said tubing and through both of said cooling units, such circulating means including an electric motor having an armature shaft, a fan rotor on one end portion of said shaft and a pump impeller on the other end portion thereof.

16. A picture projection apparatus having in the framing thereof an opening past which a film may be fed between a source of intense light and a screen whereon the film picture is to be projected, and means to prevent injury by the light beam to the film when held stationary at such opening, such means including a pair of sheets of transparent glass-like material slightly spaced apart at one face at least of the film, in substantial contact therewith, means for circulating a stream of cooling liquid in communication with the space between such pair at least of sheets, and power actuated means to force the cooling liquid in a constantly recirculating stream at a very rapid rate approximating at least about fifty feet per minute for 16 mm. film when exposed to the light from a 1500 watt concentrated filament bulb with the two cooling units in series.

17. A picture projection apparatus in accordance with claim 16, but wherein the power actuated means to circulate the cooling liquid is a power actuated pump.

18. A picture projection apparatus in accordance with claim 16, but wherein an electric motor is provided upon said apparatus having on the armature shaft thereof and driven thereby a pump impeller constituting the means for circulating the cooling liquid at a very rapid rate through said closed circuit.

19. A picture projection apparatus in accordance with claim 16, but wherein at both faces of the film there are provided in the said closed circuit a pair of slightly spaced-apart transparent sheets of glass-like material in substantial contact with the two faces of the film respectively, so that the cooling liquid is constantly circulated past both faces of the film at a very rapid rate so long as the film is held stationary in said apparatus.

20. A picture projection apparatus having in the framing thereof an opening past which a film may be fed between a source of intense light and a screen whereon the film picture is to be projected, and means to prevent injury by the light beam to the film when held stationary at such opening, said means including two cooling units substantially in contact with the two faces respectively of the film, each of said units having two sheets of transparent glass-like material slightly spaced apart, a closed circuit for circulating a stream of cooling liquid between said two pairs of transparent sheets, a small, light frame at each of the two faces of the film having said pairs of transparent sheets respectively mounted therein and with said sheets constituting said two cooling units, and movable means to secure at least one of said cooling units so that both cooling units may be placed in functioning position in substantial contact with the two faces respectively of the film and so that they may be slightly separated to permit the movement of the film.

21. A picture projection apparatus having in the framing thereof an opening past which a film may be fed between a source of intense light and a screen whereon the film picture is to be projected, and means to prevent injury by the light beam to the film when held stationary at such opening, such means including a pair of sheets of transparent glass-like material slightly spaced apart at one face at least of the film, in substantial contact therewith at such face or faces, a closed circuit for a stream of cooling liquid in communication with the space between such pair at least of sheets, a motor supported by said apparatus, a circulating pump driven by said motor for circulating and recirculating the cooling liquid through said closed circuit, a fan driven by said motor, and a cooling radiator in said circuit through which the cooling liquid is constantly forced while being circulated and recirculated through said circuit.

22. A picture projection apparatus having in the framing thereof an opening past which a film may be fed between a source of intense light and a screen whereon the film picture is to be projected, and means to prevent injury by the light beam to the film when held stationary at such opening, such means including a pair of sheets of transparent glass-like material slightly spaced apart at one face at least of the film, in substantial contact therewith thereat, a closed circuit for a stream of cooling liquid in communication with the space between such pair at least of sheets, a motor supported by said apparatus, a circulating pump driven by said motor for circulating and recirculating the cooling liquid through said closed circuit, a fan driven by said motor, a cooling radiator in said circuit through which the cooling liquid is constantly forced while being circulated and recirculated through said circuit, and a refrigerating device in functioning relation to the circulating liquid.

23. A picture projection apparatus in accordance with claim 16, but wherein the power actuated means to circulate the cooling liquid is a power actuated pump, and wherein there is provided a fan operated by the means driving said power-actuated pump, and a cooling radiator through which the cooling liquid is forced in each circulation thereof, said fan being so supported upon said apparatus that it may function to cool the lamp that is the said source of intense light, the cooling radiator and also, when desired, the film itself.

24. A picture projection apparatus having in the framing thereof an opening past which a film may be fed between a source of intense light and a screen whereon the film picture is to be projected, and means to prevent injury by the light beam to the film when held stationary at such opening, said means including two sheets of transparent glass-like material slightly spaced apart, supported in pairs at both faces of the film in substantial contact therewith, means to circulate a stream of cooling liquid in a closed circuit between both pairs of said transparent sheets, said pairs of transparent sheets each having mounting side bars, thereby forming a rigid unit, thus providing with said sheets two cooling units, and means to hold said two cooling units in such close contact with the two faces of the film as to hold the film straight and flat and in the same spot during projection, while at the same time said cooling units, by removing heat from the film, prevent warping, buckling or embossing thereof, thus keeping the film cool and also providing for a sharper focus upon the screen because of the uniformity in position of the said film throughout its projection.

25. A picture projection apparatus having in the framing thereof an opening past which a film may be fed between a source of intense light and a screen-like member whereon the film picture is to be projected, and means to prevent injury by the light beam to the film when held stationary at such opening, said means including two sheets of transparent glass-like material slightly spaced apart, supported in pairs at both faces of the film in substantial contact therewith to constitute cooling units, a pair of fluid-circulating-accelerating side bars so supporting said pairs of sheets respectively that the cooling fluid may be very rapidly circulated through said units without turbulence or cavitation, and power-actuated means to circulate the stream of cooling fluid in a closed circuit through both of said units at a very rapid rate, approximating at least fifty feet per minute for 16 mm. film, when the two cooling units are arranged in series.

26. A moving picture projection apparatus provided with film feeding means and having in the framing thereof an opening past which a film is fed in the operation of the apparatus between a source of intense light and a screen-like member whereon the film picture is to be projected, means to prevent injury by the light beam to the film when held stationary at such opening, said means including two cooling units supported at the two faces of the film respectively, in substantial contact with both faces of the film when the latter is stationary, means to circulate a cooling fluid through both of said units, and means operating in synchronism with the film feeding movements to move said cooling units into and out of substantial contact with the faces of the film, thereby to effect feeding of the film without injury thereto by the contact of the cooling units occurring while the film is stationary between movements thereof.

27. A picture projection apparatus having in the framing thereof an opening past which a film may be fed between a source of intense light and a screen-like member whereon the film picture is to be projected, means to prevent injury by the light beam to the film when held stationary at such opening, said means including two pieces of transparent glass-like material slightly spaced apart, supported at each of the faces of the film and pressed thereagainst, means to create a forced circulation of a stream of cooling fluid in a circuit between both pairs of said transparent pieces, said apparatus including a member movably connected to the framing so that it may be moved into and out of functioning position at one face of the film and having an opening for registration with the opening in the framing, said member carrying the said two pieces of transparent material at that one face of the film.

28. A picture projection apparatus in accordance with claim 27, but wherein the cooling units at the opposite faces of the film are arranged at substantially right angles to each other.

29. A picture projection apparatus having in the framing thereof an opening past which a film may be fed between a source of intense light and a screen-like member whereon the film picture is to be projected, and means to prevent injury by the beam of light to the film while held stationary at such opening, said means including two pieces of transparent glass-like material slightly spaced apart, supported in pairs at both faces of the film, and in functioning position when the film is stationary against both faces of the film, and means to circulate a stream of cooling fluid in a closed circuit through both pairs of said transparent pieces.

30. A moving picture projection apparatus in accordance with claim 26, but wherein the means operating in synchronism with the film feeding movements to move the cooling units into and out of substantial contact with the faces of the film, consist of at least one rotary cam shaped to impart very rapid in and out movements to the cooling unit, thereby to permit the feeding of the film when the units are out of contact with the faces thereof.

31. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit between both pairs of said transparent sheets, the means to circulate a stream of cooling liquid including an electric motor, a cooling radiator, a pump operated thereby to force the cooling liquid through such cooling radiator, through the necessary piping and through the two cooling units one at each face of the film.

32. A picture projection apparatus having in the framing thereof an opening past which a film may be fed between a source of intense light and a screen-like member whereon the film picture is to be projected, and means to prevent injury by the light beam to the film when held stationary at such opening, said means including two units each containing two sheets of transparent glass-like material slightly spaced apart, said units being supported at the respective faces of the film in substantial contact therewith, and means to create a forced circulation of a stream of cooling fluid in a circuit through both of said units.

33. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, a member movably connected to said framing, so that it may be moved into and out of functioning position at one face of the film, and having an opening to be brought into register with the said opening in the framing, said member carrying the said pair of transparent sheets that, in functioning position, is at such face of the film, said cooling liquid circulating means having a portion thereof movable within the movably mounted member when the latter is moved out of functioning position without necessarily interrupting the cirulation of the cooling liquid through said means.

34. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a force circulation of a stream of cooling liquid in a circuit through both pairs of said transparent sheets, the means to circulate a stream of cooling liquid past both faces of the film being devoid of interior pockets to interfere with the perfect circulation of the cooling liquid in a condition without vapor or like bubbles.

35. A picture projection apparatus having in the framing thereof an opening past which a film may be fed between a source of intense light and a screen whereon the film picture is to be projected, and means to prevent injury by the light beam to the film when held stationary at such opening, said means including sheets of transparent glass-like material slightly spaced apart, supported in pairs at both faces of the film in substantial contact therewith, and means to circulate a stream of cooling liquid in a closed circuit between both pairs of said transparent sheets.

36. A picture projection apparatus in accordance with claim 1, but wherein manually operable means is provided upon the said units and extending thereinto between the said sheets of transparent material, thereby to remove deposits that are on the inner faces of the said sheets of transparent material, without necessarily dismantling the apparatus.

37. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, means for wiping deposits that are on the inside faces of the sheets of transparent material being mounted upon the apparatus and being provided with a deposit-wiping element extending into the apparatus between such sheets in position to be manually manipulated for such purpose.

38. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, and power driven means carried by the apparatus for wiping deposits that are on the inside faces of the sheets of transparent material.

39. A picture projection apparatus in accordance with claim 1, but wherein means are provided to hold said units periodically pressed against the two faces of the film respectively at said opening.

40. A picture projection apparatus having in the framing thereof an opening past which a film may be fed between a source of intense light and a screen-like member whereon the film picture is to be projected, and means to prevent injury by the light beam to the film when held stationary at such opening, said means including two hollow units of transparent material at said opening, means to hold said units pressed against the two faces of the film respectively at said opening, and means to force a cooling liquid rapidly through both of said transparent cooling units, the means to circulate a stream of cooling liquid through said units including a power driven pump by which the said stream is forced and a cooling radiator through which the said stream of cooling liquid passes on its course through the units which are in contact with the film.

41. A picture projection apparatus having in the framing thereof an opening past which a film may be fed between a source of intense light and a screen-like member whereon the film picture is to be projected, and means to prevent injury by the light beam to the film when held stationary at such opening, said means including two hollow units of transparent material at said opening, means to hold said units pressed against the two faces of the film respectively at said opening, and means to force a cooling liquid rapidly through both of said transparent cooling units, the means to circulate a stream of cooling liquid through the cooling units including a power driven pump by which the said stream is forced, and a cooling radiator through which the stream of cooling liquid passes on its course through the units which are in contact with the two faces of the film.

42. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, and means to remove dust and lint from the faces of the film as it is entering between the pairs of sheets of transparent material.

43. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, and roller-like means, supported by the apparatus, to engage a face of the film adjacent two opposite edges of the gate and in close proximity to one of the said pairs of sheets of transparent material, thereby to prevent scratching of the film by any adjacent portions of the apparatus.

44. A picture projection apparatus having in the framing thereof an opening past which a film may be fed between a source of intense light and a screen-like member whereon the film picture is to be projected, and means to prevent injury by the light beam to the film when held stationary at such opening, said means including sheets of transparent, glass-like material slightly spaced apart, supported in pairs at both faces of the film in substantial contact therewith, means to create a forced circulation of a stream of cooling liquid in a circuit through both pairs of said transparent sheets, the sheet of transparent glass-like material of at least one of the two pairs of such sheets, and being the sheet of the said pair or pairs of such sheets that being next to the face of the film, is in part of thin, flexible, transparent material, so that the pressure of the circulating stream of cooling liquid causes the said thin, flexible, transparent material to settle or nestle into the low spots of the film without putting sufficient pressure on the high spots of the film to cause spectral colors.

45. A picture projection apparatus having in the framing thereof an opening past which a film may be fed between a source of intense light and a screen-like member whereon the film picture is to be projected, and means to prevent injury by the light beam to the film when held stationary at such opening, said means including two, small, hollow, transparent, cooling units, means to press said units against both faces of the film and to open them, and means to create a forced circulation of a stream of cooling liquid in a closed circuit through both of said cooling units.

ARTHUR T. CAHILL.

Certificate of Correction

Patent No. 2,413,288. December 31, 1946.

ARTHUR T. CAHILL.

It is hereby certified that errors appear in the above numbered patent requiring correction as follows: Sheets 7 and 8 containing Figures 29 to 33 inclusive as shown herein should appear as a part of the drawings of the Letters Patent—

Dec. 31, 1946.     A. T. CAHILL     2,413,288

PICTURE PROJECTION APPARATUS FOR STILLS AND FOR MOVING PICTURES

Filed May 5, 1945     8 Sheets-Sheet 7

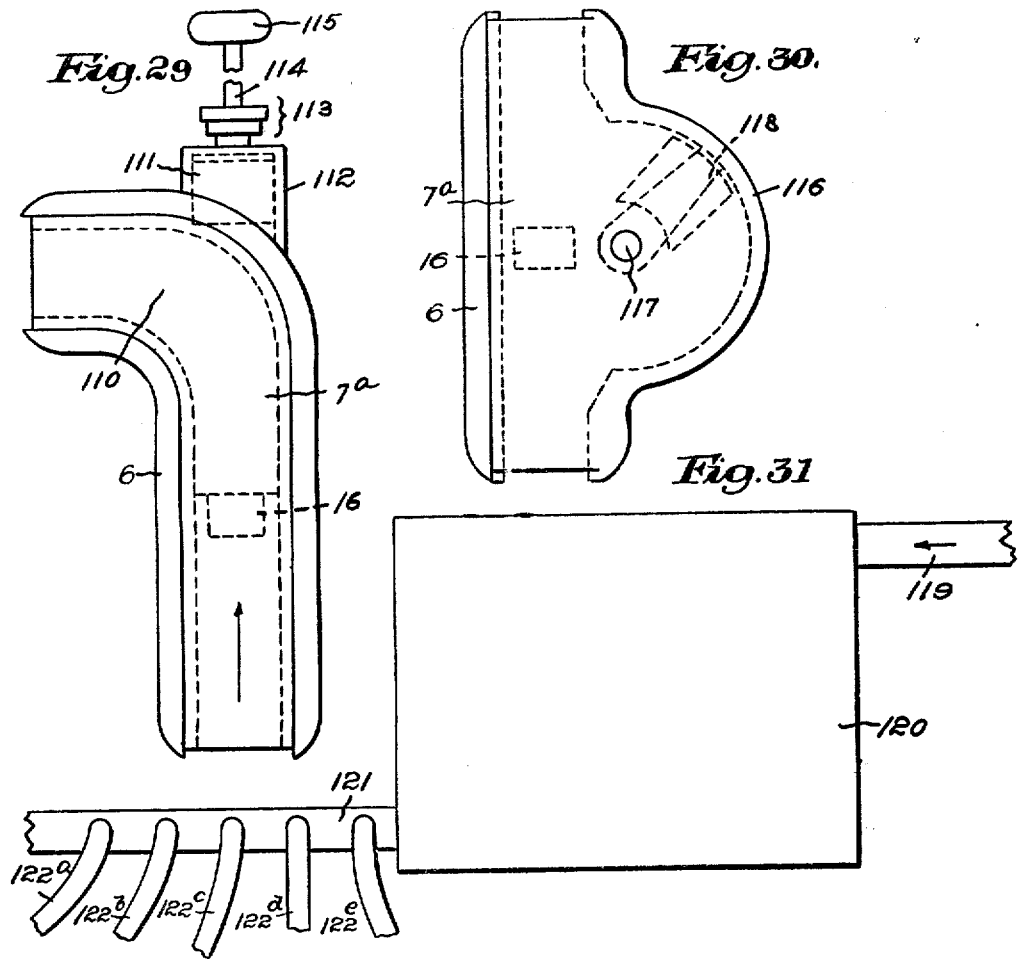

Inventor
Arthur T. Cahill.
By Emery, Booth, Townsend, Miller and Leighton
Attys

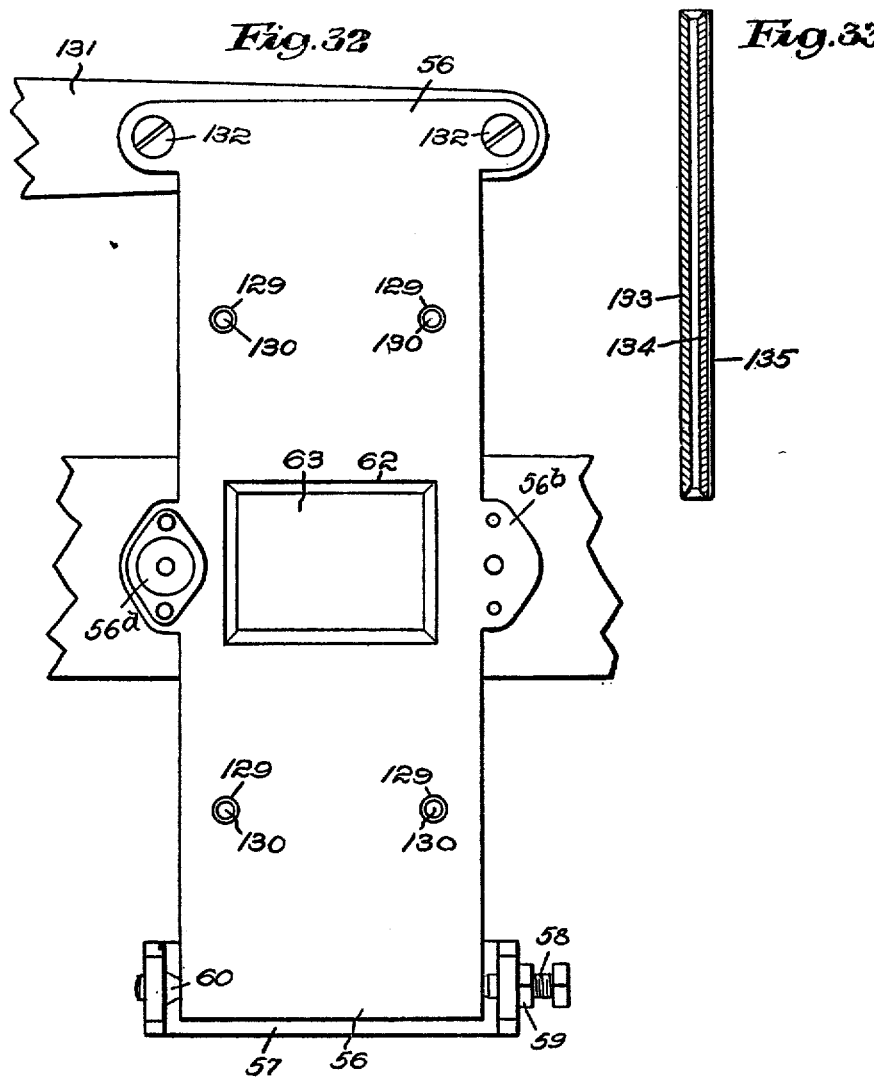
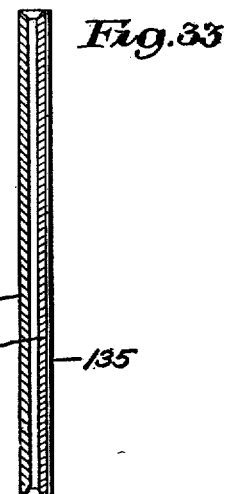

In the heading to the drawings, Sheets 1 to 6 inclusive, line 3, for "6 Sheets" read *8 Sheets*;

and that the said Letters Patent should be read with these corrections therein that the same may conform to the record of the case in the Patent Office.

Signed and sealed this 4th day of March, A. D. 1947.

[SEAL]

LESLIE FRAZER,
*First Assistant Commissioner of Patents.*